US012633523B2

(12) United States Patent
Tashita et al.

(10) Patent No.: US 12,633,523 B2
(45) Date of Patent: May 19, 2026

(54) NEGATIVE ELECTRODE FOR NONAQUEOUS ELECTROLYTE SECONDARY BATTERIES, AND NONAQUEOUS ELECTROLYTE SECONDARY BATTERY

(71) Applicant: SANYO Electric Co., Ltd., Kadoma (JP)

(72) Inventors: Takamitsu Tashita, Tokushima (JP); Fumikazu Mizukoshi, Osaka (JP); Akihiro Katogi, Tokushima (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 878 days.

(21) Appl. No.: 17/785,639

(22) PCT Filed: Dec. 21, 2020

(86) PCT No.: PCT/JP2020/047583
§ 371 (c)(1),
(2) Date: Jun. 15, 2022

(87) PCT Pub. No.: WO2021/132114
PCT Pub. Date: Jul. 1, 2021

(65) Prior Publication Data
US 2023/0061388 A1 Mar. 2, 2023

(30) Foreign Application Priority Data

Dec. 24, 2019 (JP) ................................. 2019-232453

(51) Int. Cl.
| | |
|---|---|
| *H01M 4/36* | (2006.01) |
| *H01M 4/02* | (2006.01) |
| *H01M 4/133* | (2010.01) |
| *H01M 4/134* | (2010.01) |
| *H01M 4/48* | (2010.01) |
| *H01M 4/587* | (2010.01) |

(52) U.S. Cl.
CPC ........... *H01M 4/366* (2013.01); *H01M 4/133* (2013.01); *H01M 4/134* (2013.01); *H01M 4/364* (2013.01); *H01M 4/483* (2013.01); *H01M 4/587* (2013.01); *H01M 2004/021* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 5,451,477 A | 9/1995 | Omaru et al. | |
| 2001/0051300 A1* | 12/2001 | Moriguchi | C01B 32/20 |
| | | | 423/448 |
| 2006/0008706 A1* | 1/2006 | Yamaguchi | H01M 4/134 |
| | | | 429/313 |
| 2008/0057401 A1 | 3/2008 | Mori et al. | |
| 2014/0287316 A1 | 9/2014 | Ahn et al. | |
| 2017/0018775 A1 | 1/2017 | Kobayashi et al. | |
| 2017/0125806 A1 | 5/2017 | Wang et al. | |
| 2020/0365878 A1* | 11/2020 | Ishikawa | H01M 4/622 |

FOREIGN PATENT DOCUMENTS

| | | | |
|---|---|---|---|
| CN | 101202338 A | | 6/2008 |
| CN | 106165161 A | | 11/2016 |
| CN | 106797020 A | | 5/2017 |
| CN | 109859951 A | * | 6/2019 |
| JP | 7-192724 A | | 7/1995 |
| JP | 11-250936 A | | 9/1999 |
| JP | 11246209 A | * | 9/1999 |
| JP | 2007-214038 A | | 8/2007 |
| JP | 2015-511389 A | | 4/2015 |
| JP | 2016-100240 A | | 5/2016 |
| JP | 2020-95853 A | | 6/2020 |
| WO | 2016/035289 A1 | | 3/2016 |
| WO | WO-2019131195 A1 | * | 7/2019 ........ H01M 10/0525 |

OTHER PUBLICATIONS

Machine translation of JP 2007-214038, published on Aug. 23, 2007 (Year: 2007).*
Machine translation of JP11246209A, published on Sep. 14, 1999 (Year: 1999).*
Machine translation of CN109859951A, published on Jun. 7, 2019 (Year: 2019).*
Office Action dated Jul. 6, 2024, issued in counterpart CN application No. 202080086484.X, with English translation. (11 pages).
Office Action dated Nov. 9, 2023, issued in counterpart CN Application No. 202080086484.X., with English translation. (10 pages).
International Search Report dated Mar. 2, 2021, issued in counterpart International Application No. PCT/JP2020/047583 (2 pages).

* cited by examiner

*Primary Examiner* — Anca Eoff
(74) *Attorney, Agent, or Firm* — WHDA, LLP

(57) ABSTRACT

A negative electrode for nonaqueous electrolyte secondary batteries is provided with: a negative electrode current collector; a first negative electrode mix layer arranged on a surface of the negative electrode current collector; and a second negative electrode mix layer arranged on a surface of the first negative electrode mix layer. The first negative electrode mix layer contains a first carbon material having a true density of 2.1 g/cm³ to 2.3 g/cm³, the second negative electrode mix layer contains a second carbon material having a true density of 1.5 g/cm³ to 2.0 g/cm³, the inter-particle porosity of the second carbon material in the second negative electrode mix layer is larger than that of the first carbon material in the first negative electrode mix layer, and the ratio of the mass of the first negative electrode mix layer to that of the second negative electrode mix layer is 95:5 to 80:20.

4 Claims, 1 Drawing Sheet

NEGATIVE ELECTRODE FOR NONAQUEOUS ELECTROLYTE SECONDARY BATTERIES, AND NONAQUEOUS ELECTROLYTE SECONDARY BATTERY

CROSS-REFERENCE TO RELATED APPLICATION

This application is a National Phase Application filed under 35 U.S.C. § 371 of International Application No. PCT/JP2020/047583 filed on Dec. 21, 2020 which claims the benefit of priority under 35 U.S.C. § 119(a) of Japanese Patent Application No. 2019-232453 filed in Japan on Dec. 24, 2019, the contents of which are incorporated herein by reference.

TECHNICAL FIELD

The present disclosure relates to a negative electrode for a non-aqueous electrolyte secondary battery, and a non-aqueous electrolyte secondary battery.

BACKGROUND ART

Graphite high in true density may be used as a negative electrode active material for the purpose of an increase in energy density of a non-aqueous electrolyte secondary battery. However, when a negative electrode active material includes only graphite high in true density, a problem is that a reduction in battery capacity is caused by repeating charge and discharge.

For example, Patent Literatures 1 and 2 each disclose a method for suppressing a reduction in battery capacity due to a charge-discharge cycle by using a mixed material of graphite and a non-graphite carbon material lower in true density than graphite, as a negative electrode active material.

CITATION LIST

Patent Literature

PATENT LITERATURE 1: Japanese Unexamined Patent Application Publication No. Hei 7-192724
PATENT LITERATURE 2: Japanese Unexamined Patent Application Publication No. Hei 11-250936

SUMMARY

Technical Problem

A secondary battery for in-vehicle and power storage applications is demanded to not only have a high capacity, but also be capable of dealing with rapid charge and discharge. The methods disclosed in Patent Literature 1 and Patent Literature 2 still have room for improvement in rapid charge-discharge performance.

It is an advantage of the present disclosure to provide a non-aqueous electrolyte secondary battery having a high capacity and favorable rapid charge-discharge performance.

Solution to Problem

A negative electrode for a non-aqueous electrolyte secondary battery of one aspect of the present disclosure comprises a negative electrode current collector, a first negative electrode mixture layer disposed on a surface of the negative electrode current collector, and a second negative electrode mixture layer disposed on a surface of the first negative electrode mixture layer. The first negative electrode mixture layer includes a first carbon material having a true density of 2.1 $g/cm^3$ to 2.3 g $cm^3$, the second negative electrode mixture layer includes a second carbon material having a true density of 1.5 $g/cm^3$ to 2.0 $g/cm^3$, a ratio of voids between particles of the second carbon material in the second negative electrode mixture layer is higher than a ratio of voids between particles of the first carbon material in the first negative electrode mixture layer, and a mass ratio between the first negative electrode mixture layer and the second negative electrode mixture layer is 95:5 to 80:20.

A non-aqueous electrolyte secondary battery of one aspect of the present disclosure comprises the negative electrode for a non-aqueous electrolyte secondary battery, a positive electrode, and a non-aqueous electrolyte.

Advantageous Effects of Invention

According to one aspect of the present disclosure, a non-aqueous electrolyte secondary battery having a high capacity and favorable rapid charge-discharge performance can be provided.

DESCRIPTION OF EMBODIMENTS

A negative electrode for a non-aqueous electrolyte secondary battery of one aspect of the present disclosure comprises a negative electrode current collector, a first negative electrode mixture layer disposed on a surface of the negative electrode current collector, and a second negative electrode mixture layer disposed on a surface of the first negative electrode mixture layer. The first negative electrode mixture layer includes a first carbon material having a true density of 2.1 $g/cm^3$ to 2.3 $g/cm^3$, the second negative electrode mixture layer includes a second carbon material having a true density of 1.5 $g/cm^3$ to 2.0 $g/cm^3$, the ratio of voids between particles of the second carbon material in the second negative electrode mixture layer is higher than the ratio of voids between particles of the first carbon material in the first negative electrode mixture layer, and the mass ratio between the first negative electrode mixture layer and the second negative electrode mixture layer is 95:5 to 80:20.

Hereinafter, an exemplary embodiment of a cylindrical secondary battery of the present disclosure will be described in detail with reference to drawings. In the following description, specific shapes, materials, numerical values, directions, and the like are illustrative for facilitating understanding of the present invention, and can be appropriately modified depending on the specification of the cylindrical secondary battery. An exterior body is not limited to a cylindrical body, and may be, for example, rectangular. When a plurality of embodiments and variants are included in the following description, it has been expected from the beginning that feature portions are appropriately combined and used.

Figure 1:
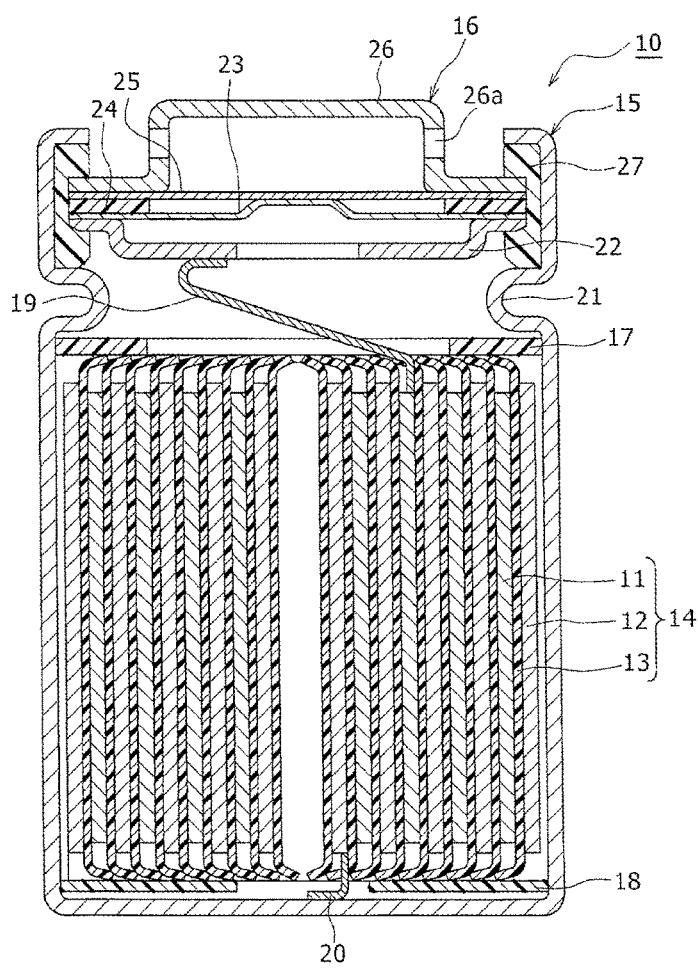
FIG. 1 is a longitudinal sectional view of a cylindrical secondary battery of an exemplary embodiment.

FIG. 1 is a longitudinal sectional view of a cylindrical secondary battery 10 of an exemplary embodiment. In the secondary battery 10 shown in FIG. 1, an electrode assembly 14 and a non-aqueous electrolyte (not shown) are housed in an exterior body 15. The electrode assembly 14 has a wound-type structure formed by winding a positive electrode 11 and a negative electrode 12 with a separator 13 being interposed therebetween. Hereinafter, there will be described under the assumption that a sealing assembly 16 side is "upper" and a bottom side of the exterior body 15 is "lower", for the purpose of illustration.

An opening end of the exterior body 15 is blocked by a sealing assembly 16, and thus the interior of the secondary battery 10 is tightly sealed. Respective insulating plates 17 and 18 are disposed above and below the electrode assembly 14. A positive electrode lead 19 passes through a though-hole in the insulating plate 17 and extends upward, and is welded to the lower surface of a filter 22, which is the bottom board of the sealing assembly 16. In the secondary battery 10, a cap 26, which is the top board of the sealing assembly 16 and electrically connected to the filter 22, serves as a positive electrode terminal. On the other hand, a negative electrode lead 20 passes through a though-hole in the insulating plate 18 and extends toward the bottom of the exterior body 15, and is welded to the inner surface of the bottom of the exterior body 15. In the secondary battery 10, the exterior body 15 serves as a negative electrode terminal. When the negative electrode lead 20 is placed on a terminal portion, the negative electrode lead 20 passes on the outside of the insulating plate 18 and extends toward the bottom of the exterior body 15, and is welded to the inner surface of the bottom of the exterior body 15.

The exterior body 15 is, for example, a cylindrical metal container having a closed-end. A gasket 27 is disposed between the exterior body 15 and the sealing assembly 16 to ensure that the interior of the secondary battery 10 is tightly sealed. The exterior body 15 has, for example, a grooved portion 21 which is formed by pressing a lateral surface from outside and which supports the sealing assembly 16. The grooved portion 21 is preferably formed annularly along the circumferential direction of the exterior body 15, and the upper surface thereof supports the sealing assembly 16 via the gasket 27.

The sealing assembly 16 has the filter 22, a lower vent member 23, an insulating member 24, an upper vent member 25, and the cap 26 which are stacked in the listed order from the electrode assembly 14 side. Each of the members constituting the sealing assembly 16 has, for example, a disk or ring shape, and the members other than the insulating member 24 are electrically connected to each other. The lower vent member 23 and the upper vent member 25 are connected to each other at respective middle portions and the insulating member 24 is interposed between respective circumferences. If the inner pressure of the battery increases by abnormal heat generation, for example, the lower vent member 23 ruptures to thereby cause the upper vent member 25 to swell toward the cap 26 and separate from the lower vent member 23, thereby breaking the electrical connection between the members. If the inner pressure further increases, the upper vent member 25 ruptures to discharge gas through an opening 26a of the cap 26.

Hereinafter, the positive electrode 11, the negative electrode 12, the separator 13 and the non-aqueous electrolyte constituting the secondary battery 10, in particular, a configuration of a first negative electrode mixture layer 32a and a second negative electrode mixture layer 32b (hereinafter, the first negative electrode mixture layer 32a and the second negative electrode mixture layer 32b may be sometimes collectively referred to as negative electrode mixture layer 32) constituting the negative electrode 12 will be described in detail.

Negative Electrode

Figure 2:
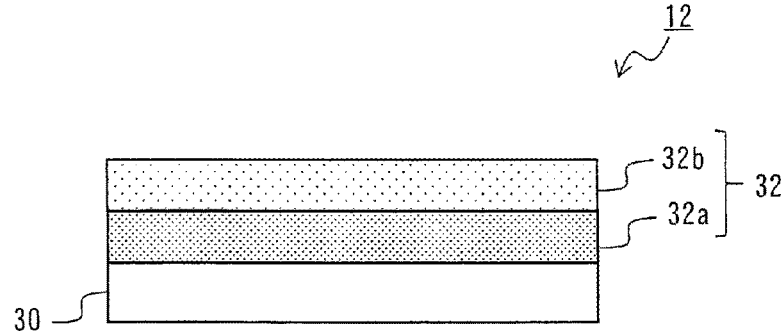
FIG. 2 is a sectional view of a negative electrode of an exemplary embodiment.

FIG. 2 is a sectional view of a negative electrode 12 of an exemplary embodiment. The negative electrode 12 comprises a negative electrode current collector 30, a first negative electrode mixture layer 32a disposed on a surface of the negative electrode current collector 30, and a second negative electrode mixture layer 32b disposed on a surface of the first negative electrode mixture layer 32a. The mass ratio between the first negative electrode mixture layer and the second negative electrode mixture layer is 95:5 to 80:20. When the mass ratio of the second negative electrode mixture layer to the first negative electrode mixture layer is less than 5/95, permeability of an electrolyte solution is so low that rapid charge-discharge performance is deteriorated. When the mass ratio of the second negative electrode mixture layer to the first negative electrode mixture layer is more than 20/80, the battery capacity is reduced.

The negative electrode current collector 30 here used is, for example, foil of a metal, such as copper, which is stable in the electric potential range of the negative electrode, or a film in which such a metal is disposed on an outer layer. The thickness of the negative electrode current collector 30 is, for example, 5 $\mu$m to 30 $\mu$m.

The first negative electrode mixture layer includes a first carbon material having a true density of 2.1 g/cm$^3$ to 2.3 g/cm$^3$. This leads to a high energy density and enables the secondary battery 10 to be high in capacity. The true density here refers to one obtained by dividing the mass by the volume not including any internal pores and pores, and can be measured by, for example, a pycnometer method. The true density of the second carbon material can also be measured in the same manner.

The first carbon material corresponds to, for example, graphite particles. Examples of the graphite particles can include natural graphite and artificial graphite particles. Natural graphite is obtained by, for example, spheronization of flake-shaped graphite naturally produced, and molding at a proper particle size. Artificial graphite is obtained by, for example, adopting a petroleum or petroleum pitch material having a specific particle shape as a starting material, firing the material at about 900° C. to 1100° C. to thereby temporarily remove a volatile component, and further firing the resultant at a high temperature of 2500° C. or more. The true density can be controlled by the firing temperature and time, and the starting material.

The second negative electrode mixture layer includes a second carbon material having a true density of 1.5 g/cm$^3$ to 2.0 g/cm$^3$. The second carbon material may be, for example, easily graphitizable graphite or hardly graphitizable graphite. The second carbon material is obtained by firing a petroleum or petroleum pitch material having a specific particle shape at about 900° C. to 1100° C., and is a material having a graphite structure in at least a portion of a crystal structure. The true density can be controlled by the firing temperature and time, and the starting material.

The ratio of voids between particles of the second carbon material in the second negative electrode mixture layer is higher than the ratio of voids between particles of the first carbon material in the first negative electrode mixture layer. The second carbon material is hard as compared with the first carbon material having a true density of 2.1 g/cm$^3$ to 2.3 g/cm$^3$, and thus is not changed in shape even after compression during formation of the negative electrode mixture layer 32, and many pores remain between particles depending on the particle shape. An increase in ratio of voids between particles leads to an enhancement in permeability of an electrolyte solution and facilitates diffusion of lithium ions in expansion and contraction of the negative electrode according to charge and discharge, thereby leading to an enhancement in rapid charge-discharge performance. In the present description, the ratio of voids between particles of the carbon material is a two-dimensional value determined from the percentage of the area of voids between particles of the carbon material to the cross sectional area of the negative electrode mixture layer, and can be calculated as follows.

Method for Measuring Ratio of Voids Between Particles of Carbon Material (1) The cross section of the negative electrode mixture layer is exposed. Examples of the method for exposing the cross section include a method involving cutting out a portion of the negative electrode and processing the resultant with an ion milling apparatus (for example, IM4000PLUS manufactured by Hitachi High-Tech Corporation) to expose the cross section of the negative electrode mixture layer.

(2) A reflection electron image of the cross section exposed of the negative electrode mixture layer is taken with a scanning electron microscope, with respect to each layer of the first negative electrode mixture layer 32a and the second negative electrode mixture layer 32b. The magnification in taking of the reflection electron image is, for example, 800×.

(3) The cross section image obtained as described above is imported into a computer and binarized with image analysis software (for example, ImageJ manufactured by National Institutes of Health), thereby obtaining an image binarized, in which the cross section of each particle in the cross section image is converted into a black image and any pore present in the cross section of such each particle is converted into a white image.

(4) Pores (pores not in communication with a particle surface) in particles of the carbon material and a portion excluding pores that are in communication with a particle surface of the carbon material and that have a width of less than 3 μm, among pores converted into white, in each image binarized of the first negative electrode mixture layer 32a and the second negative electrode mixture layer 32b, are adopted as voids between particles of the carbon material, and the area of the voids between particles of the carbon material is calculated. The ratio of voids between particles of the carbon material can be calculated based on the following expression.

> Ratio of voids between particles of carbon material=Area of voids between particles of carbon material/Area of cross section of negative electrode mixture layer×100

(5) The ratio of voids between particles of the first carbon material in the first negative electrode mixture layer 32a and the ratio of voids between particles of the second carbon material in the second negative electrode mixture layer 32b are each determined as the average of values obtained by performing the measurement three times.

Next, a specific method for forming the first negative electrode mixture layer 32a and the second negative electrode mixture layer 32b is described. For example, first, a first negative electrode mixture slurry is prepared by mixing a negative electrode active material including a first carbon material, a binder, and a solvent such as water. A second negative electrode mixture slurry is separately prepared by mixing a negative electrode active material including a second carbon material different from the first carbon material, a binder, and a solvent such as water. Both sides of a negative electrode current collector are coated with the first negative electrode mixture slurry, the resultant coatings are dried, and thereafter both sides of each of the coatings, with the first negative electrode mixture slurry, are coated with the second negative electrode mixture slurry, and the resultant coatings are dried. Furthermore, the first negative electrode mixture layer 32a and the second negative electrode mixture layer 32b can be rolled by a roller to thereby form the negative electrode mixture layer 32. While the method involves coating with the first negative electrode mixture slurry and drying of the coatings and then coating with the second negative electrode mixture slurry, coating with the second negative electrode mixture slurry may be made after coating with the first negative electrode mixture slurry and before drying of the coatings. Alternatively, after coating with the first negative electrode mixture slurry and drying and rolling of the coatings, the first negative electrode mixture layer 32a may be coated with the second negative electrode mixture slurry.

At least any one of the group consisting of the first negative electrode mixture layer 32a and the second negative electrode mixture layer 32b may include a Si material. The Si material is a material that can reversibly intercalate and deintercalate lithium ions, and functions as a negative electrode active material. Examples of the Si material include Si, an alloy including Si, and silicon oxide such as $SiO_X$ (X is 0.8 to 1.6). The Si material is a negative electrode material that can allow for a more enhancement in battery capacity than graphite particles. The content of the Si material is, for example, preferably 1 mass % to 10 mass %, more preferably 3 mass % to 7 mass % based on the mass of the negative electrode active material in view of, for example, an enhancement in battery capacity and suppression of deterioration in high-rate discharge cycle characteristics.

Examples of such other material that can reversibly intercalate and deintercalate lithium ions include a metal to be alloyed with lithium, such as tin (Sn), or an alloy or oxide including a metal element such as Sn. The negative electrode active material may include such other material, and the content of such other material is preferably, for example, 10 mass % or less based on the mass of the negative electrode active material.

The first negative electrode mixture layer 32a and the second negative electrode mixture layer 32b each preferably include, for example, a binder. Examples of the binder include fluoro resins, PAN, polyimide resins, acrylic resins, polyolefin resins, styrene-butadiene rubber (SBR), nitrile-butadiene rubber (NBR), carboxymethyl cellulose (CMC) or salts thereof, poly(acrylic acid) (PAA) or salts thereof (PAA-Na, PAA-K, and the like which may be partially neutralized salts), and poly(vinyl alcohol) (PVA). These may be used singly or may be used in combinations of two or more thereof.

Positive Electrode

The positive electrode 11 is configured from, for example, a positive electrode current collector of metal foil or the like, and a positive electrode mixture layer formed on the positive electrode current collector. The positive electrode current collector here used can be, for example, foil of a metal, such as aluminum, which is stable in the electric potential range of the positive electrode, or a film in which such a metal is disposed on an outer layer. The positive electrode mixture layer includes, for example, a positive electrode active material, a binder, and a conductive agent.

The positive electrode 11 can be produced by, for example, coating the positive electrode current collector with a positive electrode mixture slurry including, for example, a positive electrode active material, a binder, and a conductive agent, and drying the resultant to thereby form the positive electrode mixture layer, and then rolling the positive electrode mixture layer.

Examples of the positive electrode active material can include a lithium transition metal oxide containing a transition metal element such as Co, Mn, or Ni. Examples of the lithium transition metal oxide include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, $Li_2MPO_4F$ (M; at least one of Na, Mg, Sc, Y, Mn, Fe, Co, Ni, Cu, Zn, Al, Cr, Pb, Sb, and B, $0<x\leq1.2$, $0<y\leq0.9$, $2.0\leq z\leq2.3$). These may be used singly or a plurality thereof may be mixed and used. The positive electrode active material preferably includes a lithium/nickel complex oxide such as $Li_xNiO_2$, $Li_xCo_yNi_{1-y}O_2$, or $Li_xNi_{1-y}M_yO_z$ (M; at least one of Na, Mg, Sc, Y, Mn, Fe, Co, Ni, Cu, Zn, Al, Cr, Pb, Sb, and B, $0<x\leq1.2$, $0<y\leq0.9$, $2.0\leq z\leq2.3$) from the viewpoint that the capacity of the non-aqueous electrolyte secondary battery can be increased.

Examples of the conductive agent include carbon particles such as carbon black (CB), acetylene black (AB), Ketjenblack, and graphite. These may be used singly or may be used in combinations of two or more thereof.

Examples of the binder include fluoro resins such as polytetrafluoroethylene (PTFE) and poly(vinylidene fluoride) (PVdF), polyacrylonitrile (PAN), polyimide resins, acrylic resins, and polyolefin resins. These may be used singly or may be used in combinations of two or more thereof.

Separator

For example, an ion-permeable and insulating porous sheet is used as the separator 13. Specific examples of the porous sheet include a microporous thin film, woven fabric, and nonwoven fabric. Suitable examples of the material for the separator include olefin resins such as polyethylene and polypropylene, and cellulose. The separator 13 may be a laminate including a cellulose fiber layer and a layer of fibers of a thermoplastic resin such as an olefin resin. The separator may be a multi-layered separator including a polyethylene layer and a polypropylene layer, and a surface of the separator 13 to be used may be coated with a material such as an aramid resin or ceramic.

Non-Aqueous Electrolyte

The non-aqueous electrolyte includes a non-aqueous solvent and an electrolyte salt dissolved in the non-aqueous solvent. The non-aqueous electrolyte is not limited to a liquid electrolyte (electrolyte solution), and may be a solid electrolyte using a gel polymer or the like. Examples of the non-aqueous solvent that can be used include esters, ethers, nitriles such as acetonitrile, amides such as dimethylformamide, and any mixed solvent of two or more thereof. The non-aqueous solvent may contain a halogen-substituted product formed by replacing at least a portion of hydrogen of any of the above solvents with a halogen atom such as fluorine.

Examples of the esters include cyclic carbonate esters such as ethylene carbonate (EC), propylene carbonate (PC), and butylene carbonate, chain carbonate esters such as dimethyl carbonate (DMC), ethyl methyl carbonate (EMC), diethyl carbonate (DEC), methyl propyl carbonate, ethyl propyl carbonate, and methyl isopropyl carbonate, cyclic carboxylate esters such as γ-butyrolactone and γ-valerolactone, and chain carboxylate esters such as methyl acetate, ethyl acetate, propyl acetate, methyl propionate (MP), and ethyl propionate.

Examples of the ethers include cyclic ethers such as 1,3-dioxolane, 4-methyl-1,3-dioxolane, tetrahydrofuran, 2-methyltetrahydrofuran, propylene oxide, 1,2-butylene oxide, 1,3-dioxane, 1,4-dioxane, 1,3,5-trioxane, furan, 2-methylfuran, 1,8-cineole, and crown ethers, and chain ethers such as 1,2-dimethoxyethane, diethyl ether, dipropyl ether, diisopropyl ether, dibutyl ether, dihexyl ether, ethyl vinyl ether, butyl vinyl ether, methyl phenyl ether, ethyl phenyl ether, butyl phenyl ether, pentyl phenyl ether, methoxytoluene, benzyl ethyl ether, di phenyl ether, dibenzyl ether, o-dimethoxybenzene, 1,2-diethoxyethane, 1,2-dibutoxyethane, diethylene glycol dimethyl ether, diethylene glycol diethyl ether, diethylene glycol dibutyl ether, 1,1-dimethoxymethane, 1,1-diethoxyethane, triethylene glycol dimethyl ether, and tetraethylene glycol dimethyl ether.

Preferable examples of the halogen-substituted product for use include a fluorinated cyclic carbonate ester such as fluoroethylene carbonate (FEC), a fluorinated chain carbonate ester, and a fluorinated chain carboxylate ester such as methyl fluoropropionate (FMP).

The electrolyte salt is preferably a lithium salt. Examples of the lithium salt include $LiBF_4$, $LiClO_4$, $LiPF_6$, $LiAsF_6$, $LiSbF_6$, $LiAlCl_4$, $LiSCN$, $LiCF_3SO_3$, $LiCF_3CO_2$, $Li(P(C_2O_4)F_4)$, $LiPF_{6-x}(C_nF_{2n+1})_x$ (where $1<x<6$, and n is 1 or 2). $LiB_{10}Cl_{10}$, LiCl, LiBr, LiI, chloroborane lithium, lithium lower aliphatic carboxylate, borate salts such as $Li_2B_4O_7$ and $Li(B(C_2O_4)F_2)$, and imide salts such as $LiN(SO_2CF_3)_2$ and $LiN(C_1F_{2l+1}SO_2)(C_mF_{2m+1}SO_2)$ {where l and m are integers of 1 or more}. These lithium salts may be used singly or a plurality thereof may be mixed and used. Among these. $LiPF_6$ is preferably used in view of ionic conductivity, electrochemical stability, and other properties. The concentration of the lithium salt is preferably 0.8 to 1.8 mol per liter of the solvent.

EXAMPLES

Hereinafter, the present disclosure will be further described with reference to Examples, but the present disclosure is not intended to be limited to such Examples.

Example 1

Production of Positive Electrode

Lithium cobaltate containing zirconium, magnesium and aluminum ($LiCo_{0.979}Zr_{0.001}Mg_{0.01}Al_{0.01}O_2$) was used as a positive electrode active material. Mixed were 95 parts by mass of the positive electrode active material, 2.5 parts by mass of a carbon powder as a conductive agent, and 2.5 parts by mass of a poly(vinylidene fluoride) powder as a binder, and an appropriate amount of N-methyl-2-pyrrolidone (NMP) was further added thereto to prepare a positive electrode mixture slurry. Both sides of a positive electrode current collector made of aluminum foil (thickness 15 μm) were coated with the slurry by a doctor blade method, and the resultant coatings were dried and then rolled by a roller to thereby produce a positive electrode in which a positive electrode mixture layer was formed on each of both sides of the positive electrode current collector.

Production of Carbon Material A

Coke was pulverized until the average particle size reached 13 μm, pitch as a binder was added to the coke pulverized, and the resultant was pressurized and molded into a block. Such a block molded product was fired and graphitized at a temperature of 2500° C. or more, and thereafter the block molded product was pulverized and sieved using a 250-mesh sieve, to thereby obtain carbon material A having an average particle size of 23 μm. The true density of carbon material A produced was measured by a pycnometer method, and as a result, was 2.2 g/cm³.

Production of Carbon Material B

Coke was pulverized until the average particle size reached 13 μm, pitch as a binder was added to the coke pulverized, and the coke was aggregated until the average particle size reached 18 μm. After such an aggregated product was fired at a temperature of 1000° C., the resultant was sieved using a 250-mesh sieve, to thereby obtain carbon material B having an average particle size of 18 μm. The true density of carbon material B produced was measured by a pycnometer method, and as a result, was 1.7 g/cm³.

Production of Negative Electrode

Mixed were 94 parts by mass of carbon material A and 6 parts by mass of SiO, and the resultant was adopted as negative electrode active material A. Negative electrode active material A, a Na salt of carboxymethyl cellulose (CMC-Na), and styrene-butadiene copolymer rubber (SBR) were mixed such that the mass ratio thereof was 100:1:1, and the mixture was kneaded in water, to thereby prepare a first negative electrode mixture slurry. Mixed were 94 parts by mass of carbon material B and 6 parts by mass of SiO, and the resultant was adopted as negative electrode active material B. Negative electrode active material B, CMC-Na and SBR were mixed such that the mass ratio thereof was 100:1:1, and the mixture was kneaded in water to thereby prepare a second negative electrode mixture slurry.

Both sides of a negative electrode current collector made of copper foil were coated with the first negative electrode mixture slurry by a doctor blade method to form a first negative electrode mixture layer. The first negative electrode mixture layer was further coated with the second negative electrode mixture slurry as described above to thereby form a second negative electrode mixture layer. The coating mass ratio per unit area between the first negative electrode mixture slurry and the second negative electrode mixture slurry was here 90:10. The first negative electrode mixture layer and the second negative electrode mixture layer were dried, and then rolled by a roller to thereby produce a negative electrode. The amount of each slurry for coating in the positive electrode and the negative electrode was herein adjusted so that the charge capacity ratio (Negative electrode charge capacity/Positive electrode charge capacity) as the ratio of the negative electrode charge capacity to the positive electrode charge capacity at 4.2 V was 1.1.

Production of Non-Aqueous Electrolyte

LiPF₆ was dissolved at a concentration of 1.0 mol/L in a non-aqueous solvent obtained by mixing ethylene carbonate (EC), propylene carbonate (PC), and ethyl methyl carbonate (EMC) in a volume ratio of 10:10:80, and the resultant was adopted as a non-aqueous electrolyte.

Production of Non-Aqueous Electrolyte Secondary Battery (1) A cylindrical electrode assembly was produced by attaching a positive electrode lead to the positive electrode current collector and attaching a negative electrode lead to the negative electrode current collector, then winding the positive electrode and the negative electrode with a separator made of a microporous membrane made of polyethylene being interposed therebetween, and applying a tape made of polypropylene onto the outermost circumference. Thereafter, the electrode assembly was pressed to thereby provide a flat electrode assembly.

(2) A sheet-shaped laminated material having a five-layered structure of resin layer (polypropylene)adhesive layer/aluminum alloy layer/adhesive layer/resin layer (polypropylene) was prepared, a cup-shaped housing part for housing the electrode assembly was disposed on the laminated material, and the laminated material was turned back so as to cover the housing part, to thereby form a pouch exterior body. The flat electrode assembly and the non-aqueous electrolyte were inserted into the housing part of the exterior body in a glove box under an argon atmosphere. Thereafter, the interior of the exterior body was depressurized, the interior of the separator was impregnated with the non-aqueous electrolyte, and the opening end of the exterior body was sealed, to thereby produce a pouch-type non-aqueous electrolyte secondary battery having a height of 62 mm, a width of 35 mm, and a thickness of 3.6 mm.

Examples 2 and 4, and Comparative Examples 5 to 7

Each non-aqueous electrolyte secondary battery was produced in the same manner as in Example 1 except that the mass ratio between the first negative electrode mixture layer and the second negative electrode mixture layer was changed as shown in Table 1.

Example 3

A non-aqueous electrolyte secondary battery was produced in the same manner as in Example 2 except that negative electrode active material C produced by mixing carbon material C produced as follows, instead of active material B, and SiO was used.

Production of Carbon Material C

Coke was pulverized until the average particle size reached 13 μm, pitch as a binder was added to the coke pulverized, and the coke was aggregated until the average particle size reached 18 μm. After such an aggregated product was fired at a temperature of 1050° C., the resultant was sieved using a 250-mesh sieve, to thereby obtain carbon material C having an average particle size of 18 μm. The true density of carbon material C produced was measured by a pycnometer method, and as a result, was 1.9 g/cm³.

Comparative Examples 1 to 4

Each non-aqueous electrolyte secondary battery was produced in the same manner as in Example 1 except that a single-layered negative electrode mixture layer including each negative electrode active material shown in Table 1 was used instead of the two-layered negative electrode mixture layer.

Calculation of Ratio of Voids between Particles of Carbon Material

Each of the non-aqueous electrolyte secondary batteries of Examples and Comparative Examples was charged to 4.2 V at a constant current of 0.2 C (920 mA) and then charged to C/50 at a constant voltage of 4.2 V under an environmental temperature of 25° C. Thereafter, each of the batteries was discharged to 2.5 V at a constant current of 0.5 C. Such charge and discharge were defined as one cycle, and performed for 5 cycles. The negative electrode was taken out from each of the non-aqueous electrolyte secondary batteries of Examples and Comparative Examples, after 5 cycles, and the ratio of voids between particles of the carbon material was compared between the first negative electrode mixture layer and the second negative electrode mixture layer. As a result, it was confirmed in all Examples 1 to 4 and Comparative Examples 5 to 7 that the ratio of voids between particles of the second carbon material in the second negative electrode mixture layer was higher than the ratio of voids between particles of the first carbon material in the first negative electrode mixture layer. The ratio of voids between particles of the carbon material was here not measured in each of Comparative Examples 1 to 4.

Measurement of Liquid Absorption Time

Each of the negative electrodes of Examples and Comparative Examples was dried in a constant-temperature bath warmed to 200° C. under a nitrogen atmosphere for 10 hours, and each of the negative electrodes was cut to a size of 2 cm×5 cm, to thereby produce each sample. Onto a surface of such each sample was perpendicularly dropped 3 μL of polypropylene carbonate (PC), and the time until PC was absorbed into the sample was visually observed. Such measurement was performed six times with respect to such each sample, and the average value was defined as the liquid absorption time. A shorter liquid absorption time here exhibits better permeability of an electrolyte solution to the negative electrode.

Measurement of Battery Capacity and Discharge Characteristics on Load

Each of the non-aqueous electrolyte secondary batteries of Examples and Comparative Examples was charged to 4.2 V at a constant current of 1 C (800 mA) and then charged to ⅟50 C at a constant voltage of 4.2 V under an environmental temperature of 25° C. Thereafter, the discharge capacity in discharge to 2.75 V at a constant current of 1 C (800 mA) was defined as the 1 C discharge capacity. The discharge capacity in discharge to 4.2 V at a constant current in the same manner and then charge to ⅟50 C at a constant voltage of 4.2 V, and thereafter discharge to 2.75 V at a constant current of 3 C (2400 mA) was defined as the 3 C discharge capacity. Discharge characteristics on load of each of the non-aqueous electrolyte secondary batteries of Examples and Comparative Examples were determined according to the following expression. Higher discharge characteristics on load here exhibit better discharge characteristics. The 1 C discharge capacity was defined as the battery capacity.

$$\text{Discharge characteristics on load} = (3\ C\ \text{discharge capacity}/1\ C\ \text{discharge capacity}) \times 100$$

Table 1 summarized the results of the permeability of an electrolyte solution, the discharge characteristics on load, and the battery capacity in each of the non-aqueous electrolyte secondary batteries of Examples and Comparative Examples. Table 1 showed each value in other Examples and Comparative Examples, as a relative value, under the assumption that the liquid absorption time, discharge characteristics on load, and battery capacity in Comparative Example 1 were each 100. Table 1 also showed the types of and the mass ratio between the negative electrode active materials of the first negative electrode mixture layer and the second negative electrode mixture layer.

TABLE 1

| | First negative electrode mixture layer | | Second negative electrode mixture layer | | | | |
| | Negative electrode active material | Mass ratio (%) | Negative electrode active material | Mass ratio (%) | Liquid absorption time (relative value) | Discharge characteristics on load (relative value) | Battery capacity (relative value) |
|---|---|---|---|---|---|---|---|
| Example 1 | A | 90 | B | 10 | 85 | 103 | 98 |
| Example 2 | A | 85 | B | 15 | 83 | 104 | 96 |
| Example 3 | A | 85 | C | 15 | 85 | 103 | 98 |
| Example 4 | A | 80 | B | 20 | 82 | 104 | 95 |
| Comparative Example 1 | Only A | | | | 100 | 100 | 100 |
| Comparative Example 2 | Only B | | | | 82 | 103 | 79 |
| Comparative Example 3 | Mixture (A:B—90:10) | | | | 99 | 101 | 98 |
| Comparative Example 4 | Mixture (A:B—85:15) | | | | 98 | 101 | 96 |
| Comparative Example 5 | A | 75 | B | 25 | 85 | 103 | 93 |
| Comparative Example 6 | A | 60 | B | 40 | 85 | 103 | 92 |
| C omparative Example 7 | A | 50 | B | 50 | 86 | 103 | 89 |

Comparative Example 2, although exhibited enhanced discharge characteristics on load, exhibited significantly reduced battery capacity, as compared with Comparative Example 1. The results suppose that use of negative electrode active material B leads to enhancements in discharge characteristics on load, although leads to a reduction in battery capacity. In this regard, Comparative Examples 3 and 4 each using the mixture of negative electrode active material A and negative electrode active material B, although exhibited a suppressed reduction in battery capacity, did not exert any sufficient effect of enhancing discharge characteristics on load, as compared with Comparative Example 2. Thus, use of the mixture of negative electrode active material A and negative electrode active material B within suppression of a reduction in battery capacity cannot lead to sufficiently enhanced discharge characteristics on load. On the other hand, Examples 1 to 4 each exhibited a suppressed reduction in battery capacity as in Comparative Examples 3 and 4, and also exhibited discharge characteristics on load, equivalent to or more than those in Comparative Example 2. Thus, use of a two-layered negative electrode mixture layer satisfying predetermined conditions enables a non-aqueous electrolyte secondary battery having a high capacity and favorable rapid charge-discharge characteristics to be realized.

REFERENCE SIGNS LIST 10 secondary battery, 11 positive electrode, 12 negative electrode, 13 separator, 14 electrode assembly, 15 exterior body, 16 sealing assembly, 17, 18 insulating plate, 19 positive electrode lead, 20 negative electrode lead, 21 grooved portion, 22 filter, 23 lower vent member, 24 insulating member. 25 upper vent member. 26 cap, 26a opening, 27 gasket. 30 negative electrode current collector, 32 negative electrode mixture layer, 32a first negative electrode mixture layer, 32b second negative electrode mixture layer

The invention claimed is:

1. A negative electrode for a non-aqueous electrolyte secondary battery, comprising:

a negative electrode current collector;

a first negative electrode mixture layer disposed on a surface of the negative electrode current collector; and a second negative electrode mixture layer disposed on a surface of the first negative electrode mixture layer; wherein the first negative electrode mixture layer includes a first carbon material having a true density of 2.1 $g/cm^3$ to 2.3 $g/cm^3$, the second negative electrode mixture layer includes a second carbon material having a true density of 1.9 $g/cm^3$ to 2.0 $g/cm^3$, a ratio of voids between particles of the second carbon material in the second negative electrode mixture layer is higher than a ratio of voids between particles of the first carbon material in the first negative electrode mixture layer, and a mass ratio between the first negative electrode mixture layer and the second negative electrode mixture layer is 95:5 to 80:20.

2. The negative electrode for a non-aqueous electrolyte secondary battery according to claim 1, wherein at least one of the group consisting of the first negative electrode mixture layer and the second negative electrode mixture layer includes a Si material.

3. A non-aqueous electrolyte secondary battery comprising:

the negative electrode for a non-aqueous electrolyte secondary battery according to claim 1;

a positive electrode; and a non-aqueous electrolyte.

4. A method of manufacturing a negative electrode for a non-aqueous electrolyte secondary battery, the method comprising:

manufacturing a first carbon material from a first starting material by firing the first starting material at 900° C. to 1100° C., and further firing a resultant first starting material at a high temperature of 2500° C. or more;

manufacturing a second carbon material from a second starting material by firing the second starting material at 900° C. to 1100° C.;

disposing a first negative electrode mixture layer including the first carbon material on a surface of a negative electrode current collector; and disposing a second negative electrode mixture layer including the second carbon material on a surface of the first negative electrode mixture layer; wherein the second carbon material has a true density that is smaller than a true density of the first carbon material, a ratio of voids between particles of the second carbon material in the second negative electrode mixture layer is higher than a ratio of voids between particles of the first carbon material in the first negative electrode mixture layer, and a mass ratio between the first negative electrode mixture layer and the second negative electrode mixture layer is 95:5 to 80:20.

* * * * *